United States Patent
Levacher et al.

(10) Patent No.: US 11,842,256 B2
(45) Date of Patent: Dec. 12, 2023

(54) ENSEMBLE TRAINING IN A DISTRIBUTED MARKETPLACE

(71) Applicant: INTERNATIONAL BUSINESS MACHINES CORPORATION, Armonk, NY (US)

(72) Inventors: Killian Levacher, Dundrum (IE); Emanuele Ragnoli, Mulhuddart (IE); Stefano Braghin, Dublin (IE); Gokhan Sagirlar, Dublin (IE)

(73) Assignee: International Business Machines Corporation Armonk, New York, NY (US)

( * ) Notice: Subject to any disclaimer, the term of this patent is extended or adjusted under 35 U.S.C. 154(b) by 416 days.

(21) Appl. No.: 15/929,683

(22) Filed: May 15, 2020

(65) Prior Publication Data
US 2021/0357819 A1    Nov. 18, 2021

(51) Int. Cl.
*G06N 20/20* (2019.01)
*H04L 9/00* (2022.01)
*G06N 3/088* (2023.01)

(52) U.S. Cl.
CPC ............ *G06N 20/20* (2019.01); *G06N 3/088* (2013.01); *H04L 9/50* (2022.05)

(58) Field of Classification Search
CPC ........... G06N 20/20; G06N 3/088; H04L 9/50
USPC ........................................................ 706/15
See application file for complete search history.

(56) References Cited

U.S. PATENT DOCUMENTS

| | | | |
|---|---|---|---|
| 10,303,978 B1 | 5/2019 | Kang et al. | |
| 10,423,861 B2 | 9/2019 | Gao et al. | |
| 10,438,212 B1 | 10/2019 | Jilani et al. | |
| 2021/0248517 A1* | 8/2021 | Soppin | G06N 20/20 |
| 2022/0198562 A1* | 6/2022 | Cella | G06Q 40/04 |

OTHER PUBLICATIONS

Zola, et al., "Bitcoin and Cybersecurity: Temporal Dissection of Blockchain Data to Unveil Changes in Entity Behavioral Patters", Appl. Sci. 2019, 9, 5003 (Year: 2019).*
Anonymous. "User Interface and Application Programming Interface for Explaining Personalized Machine-Learned Model Outputs" IPCOM000252271D; IPCOM Publication Jan. 3, 2018, (34 Pages).
Anonymous. "Applying Machine Learning Techniques to Determine Product Risks"; IPCOM000256883D; IPCOM Publication Jan. 7, 2019. (29 Pages).
Anonymous; "An Optimized IT Subsystem Health Scoring Method Through Combination of Time Series Model and Traditional Machine Learning Model"; IPCOM000260282D; IPCOM Publication Nov. 9, 2019; (6 Pages).
Anonymous; "Predictive Cryptocurrency Mining and Staking"; IPCOM000252017D; IPCOM Publication Dec. 13, 2017; (34 Pages).

(Continued)

*Primary Examiner* — Tsu-Chang Lee
(74) *Attorney, Agent, or Firm* — John A. Griffiths; Samuel A. Waldbaum

(57) ABSTRACT

Embodiments for ensemble training in a distributed marketplace in a computing environment. One or more ensemble machine learning models may be provided from a plurality of machine learning models competing within the distributed marketplace that achieve a performance on ensemble training data equal to or greater than a selected performance threshold, wherein the distributed marketplace is a blockchain.

20 Claims, 7 Drawing Sheets

(56) References Cited

OTHER PUBLICATIONS

Singularitynet; "A Decentralized Open Market and Network for AIS"; Whitepaper 2.0 Feb. 2019 (86 Pages).
Terrapittayanon, S et al.; "Daimon: a Decentralized Artificial Intelligence Model Network"; (8 Pages).
Verma, D., Julier, S., & Cirincione, "Federated AI for building AI Solutions across Multiple Agencies." This research was sponsored by the U.S. Army Research La-boratory and the U.K. Ministry of Defence under Agreement No. W911NF-16-3-0001 (7 Pages).
Bonawitz, K., Eichner, H., Grieskamp, W., Huba, D., Ingerman, A., Ivanov, V., . . . Roselander, J. Mar. 22, 2019. "Towards Federated Learning at Scale: System Design." (15 Pages).
Weng, J.-S., Weng, J., Li, M., Zhang, Y., & Luo, W. Journal of Latex Class Files, vol. 14, No. 8, Nov. 2019 "DeepChain: Auditable and Privacy-Preserving Deep Learning with Blockchain-based Incentive" (18 Pages).

* cited by examiner

ENSEMBLE TRAINING IN A DISTRIBUTED MARKETPLACE

BACKGROUND OF THE INVENTION

Field of the Invention

The present invention relates in general to computing systems, and more particularly to, various embodiments for ensemble training in a distributed marketplace by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine Learning is a form of artificial intelligence that is employed to allow computers to evolve behaviors based on empirical data.

SUMMARY OF THE INVENTION

Various embodiments for ensemble training in a distributed marketplace in a computing environment using one or more processors are provided. In one embodiment, by way of example only, a method for ensemble training in a distributed marketplace in a computing environment, again by one or more processors, is provided. One or more ensemble machine learning models may be provided from a plurality of machine learning models competing within the distributed marketplace that achieve a performance on ensemble training data equal to or greater than a selected performance threshold, wherein the distributed marketplace is a blockchain.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
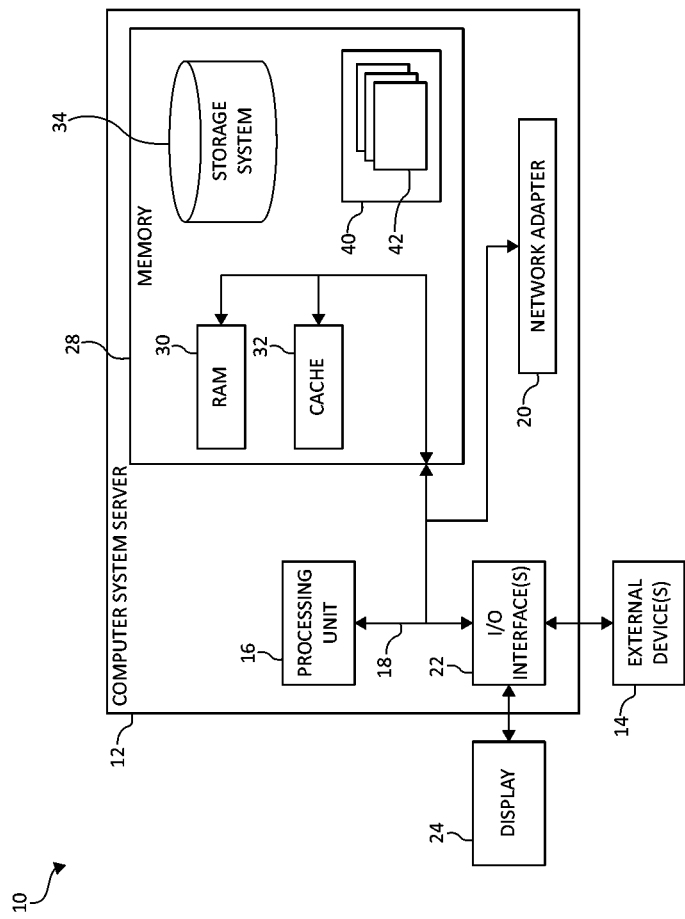
FIG. 1 is a block diagram depicting an exemplary cloud computing node according to an embodiment of the present invention.

Machine learning allows for an automated processing system (a "machine"), such as a computer system or specialized processing circuit, to develop generalizations about particular data sets and use the generalizations to solve associated problems by, for example, classifying new data. Once a machine learns generalizations from (or is trained using) known properties from the input or training data, it can apply the generalizations to future data to predict unknown properties.

In machine learning and cognitive (e.g., intelligence) science, neural networks are a family of statistical learning models inspired by the biological neural networks of animals, and in particular the brain. Neural networks can be used to estimate or approximate systems and functions that depend on a large number of inputs and are generally unknown. Neural networks use a class of algorithms based on a concept of inter-connected "neurons." In a typical neural network, neurons have a given activation function that operates on the inputs. By determining proper connection weights (a process also referred to as "training"), a neural network achieves efficient recognition of desired patterns, such as images and characters. Oftentimes, these neurons are grouped into "layers" in order to make connections between groups more obvious and to each computation of values. Training the neural network is a computationally intense process. For example, designing machine learning (ML) models, particularly neural networks for deep learning, typically involves millions of neurons and the model training involves learning the correct value to ascribe to these neurons in a trial-and-error process. Machine learning may be applied in a variety of applications and industries.

For example, machine learning may be applied to distributed file systems such as, for example, a blockchain, in computing systems. Blockchains or blockchain is a distributed database that keeps a continuously growing list of data records. Each data record is protected against tampering and revisions. Blockchains are used with public ledgers of transactions, where the record is enforced cryptographically.

Said differently, a blockchain is distributed database that may be used to maintain a transaction ledger. A transaction ledger may denote an ordered set of transactions that have been validated or confirmed within a system up to a certain point in time. A transaction ledger may include a continuously-growing list of data records, where each data record may include data relating to one transaction. Further, encryption and other security measures may be used to secure the transaction ledger from tampering and revision. The blockchain may include a number of blocks, each block holding one or more individual transactions or data records. Further, each block may contain a timestamp and a link to a previous block. A blockchain network may be used and enabled users may be allowed to connect to the network, send new transactions to the blockchain, verify transactions, and/or create new blocks.

Additionally, the blockchain database maintains a continuously growing list of data records and is formed from blocks of data records that are connected together through the use of hashing. For example, every time a new block is added to the blockchain, the new block includes a hash of a prior block. In this manner, each additional block creates additional security for the validity of the entire blockchain. Each block records and confirms the sequence and timing of transactions, e.g., smart contracts, as they are created and/or executed. That is, smart contracts provide for the storage of data within blockchain transactions and may also be automatically executed when predetermined terms and conditions are met. Thus, blockchain technology was developed as a way of providing a publicly transparent and decentralized ledger that is configured to track and store digital transactions in a publicly verifiable, secure, and hardened manner to prevent tampering or revision.

Thus, many systems attempt to train machine learning models over arbitrary datasets. However, comparing the performance of individual machine learning models over identical datasets is time consuming and resource intensive. The process involved in the remuneration of compute nodes delivering such models is not integrated and fails take into account the quality of individual machine learning models with respect to each other. Thus, using various machine learning operations and a distributed marketplace such as, for example, a blockchain, the present invention provides the ability for an issuer node (e.g., an issuer machine learning node) to selectively choose and purchase a machine learning model trained over an arbitrary dataset, while at the same time fairly remunerating individual machine learning model producers based on the relative performance of the individual machine learning model executed by the individual machine learning model producer (e.g., a compute node in a marketplace/blockchain).

Said differently, various embodiments of the present invention provide for ensemble training in a distributed marketplace (e.g., a blockchain) in a computing environment. One or more ensemble machine learning models may be provided from a plurality of machine learning models competing within the distributed marketplace (e.g., a blockchain) that achieve a performance on ensemble training data equal to or greater than a selected performance threshold, wherein the distributed marketplace is a blockchain.

In an additional aspect, mechanisms of the illustrated embodiments described herein provide for 1) coordinating and enabling competition of model training over a common dataset, 2) coordinating and enabling competition of ensemble optimizers over a common dataset, and/or 3) enable remuneration of model produces based on their relative performance over a common dataset.

To further illustrate, consider the following example employing various embodiments for federated AI ensemble training and evaluation. Assume a user (e.g., a major publishing company) desires to a create an event detection named entity recognition ("NER") model so as to contribute to the existing functionalities of a current platform (e.g., platform of the user/entity such as, for example, a website) using one or more aspects of the present invention (e.g., an intelligent ensemble training and evaluation service for federated AI ensemble training and evaluation). For example, by employing one or more aspects of the present invention, the event detection NER model would enable the user's platform to have more functionalities such as, for example, filtering the articles on the user's platform based on what event occurred (e.g., ACME stock price dropped based on event "A" occurring).

The user possesses a dataset of various data sources (e.g., news articles) in which specific events (e.g., ACME company launched its initial public offering "IPO", or ACME CEO resigns etc.) are annotated as such. The user issues a request to the platform for such an event detection NER model as follows.

Step 1), the request may include an annotated dataset split into a training dataset and an ensemble training dataset. Step 2), the request may include a performance Ask (e.g., required performance specifications, attributes, levels of performance accuracy, and/or characteristics desired in a request model) specifying that the model should achieve at least 80% accuracy on the ensemble training dataset. Step 3), the request may include a maximum ("Max") time limit (e.g., the model should be returned in a maximum 20 days to perform integration tests after day 21). Step 4), the request may include a payment token (e.g., 10 Ethereum "Ether" tokens paid if a model meeting these requirements is returned.

Assume now that the platform signals to the user that an event detection NER model with an accuracy of 81% is ready and query the user to determine whether the suggested event detection NER model achieving 81% performance accuracy is sufficient or whether higher accuracies should be reached. The user may then respond and indicates that the performance accuracy should be greater than 81% and selects the waiting option. Thus, one or more of the various steps may repeat themselves until day 18 where the platforms returns an event detection NER model with accuracy 92%. At this point the user decides to halt the training process. The payment token may be released to the platform and the training model handed back to the user.

It should be noted, by way of example, only, the performance Ask may mean or refer to that a model gives at a defined level of accuracy (e.g., a minimum 85% accuracy) on the data being given based on annotations provided. For example, assume you have various journal articles of a data sources as a dataset and the labels include one or more events annotated by an event of type "StockPriceMovement" that is associated with a sentence "ACME company have seen their share price drop this Monday morning", or an event such as, for example, "New ACME CEO" associated with sentence "John Doe will take over as CEO." An 85% accuracy would include in a model identifying at least 85% of these sentences being associated with an event, and for all events detected, 85% of the events were assigned a correct event label. In other sentences it did not assign the "New ACME CEO" event label to the ACME company sentence.

Thus, mechanisms of the illustrated embodiments use as input data a performance ask, training data and ensemble Training Data, and a payment token. Returning as output, mechanisms of the illustrated embodiments provided one or more models with a performance level (e.g., a performance level greater than a defined threshold and/or percentage value) above and/or equal to a performance ask over the ensemble training data submitted. Payment distribution allocated may be provided and distributed based on individual performance of model producers.

As used herein, by way of example only, "best," "appropriate," and/or "optimize" may be used herein interchangeable and refer to and/or defined as "maximize," "minimize," or attain one or more specific targets, objectives, goals, or intentions. "Best," "appropriate," and/or "optimize" may also refer to maximizing a benefit to a user (e.g., maximize a workflow pipeline). "Best," "appropriate," and/or "optimize" may also refer to making the most effective or functional use of a situation, opportunity, or resource.

Additionally, "best," "appropriate," and/or "optimize" may need not refer to a best solution or result but may refer to a solution or result that "is good enough" for a particular application, for example. In some implementations, an objective is to suggest a "best" combination of sections/items/defined objects, but there may be a variety of factors that may result in alternate suggestion of a combination of sections/items/defined objects/activities/applications yielding better results. Thus, some changes to the variety of factors may result in a jump from one minimum/maximum to another minimum/maximum. In either case, resulting suggestions of a combination of sections/items/defined objects/activities/applications of the optimal/best executor nodes may be determined by whatever "function" may be considered "good enough," "substantially optimal," and/or "sufficiently good." Herein, the terms "best," "appropriate," and/or "optimize" may also refer to such results based on minima (or maxima, depending on what parameters are considered in the optimization problem) for suggesting of a combination of optimal/best applications, programs, and/or computing components.

In an additional aspect, the terms "optimize" and/or "optimizing" may refer to an operation performed in order to achieve an improved result such as, for example, reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
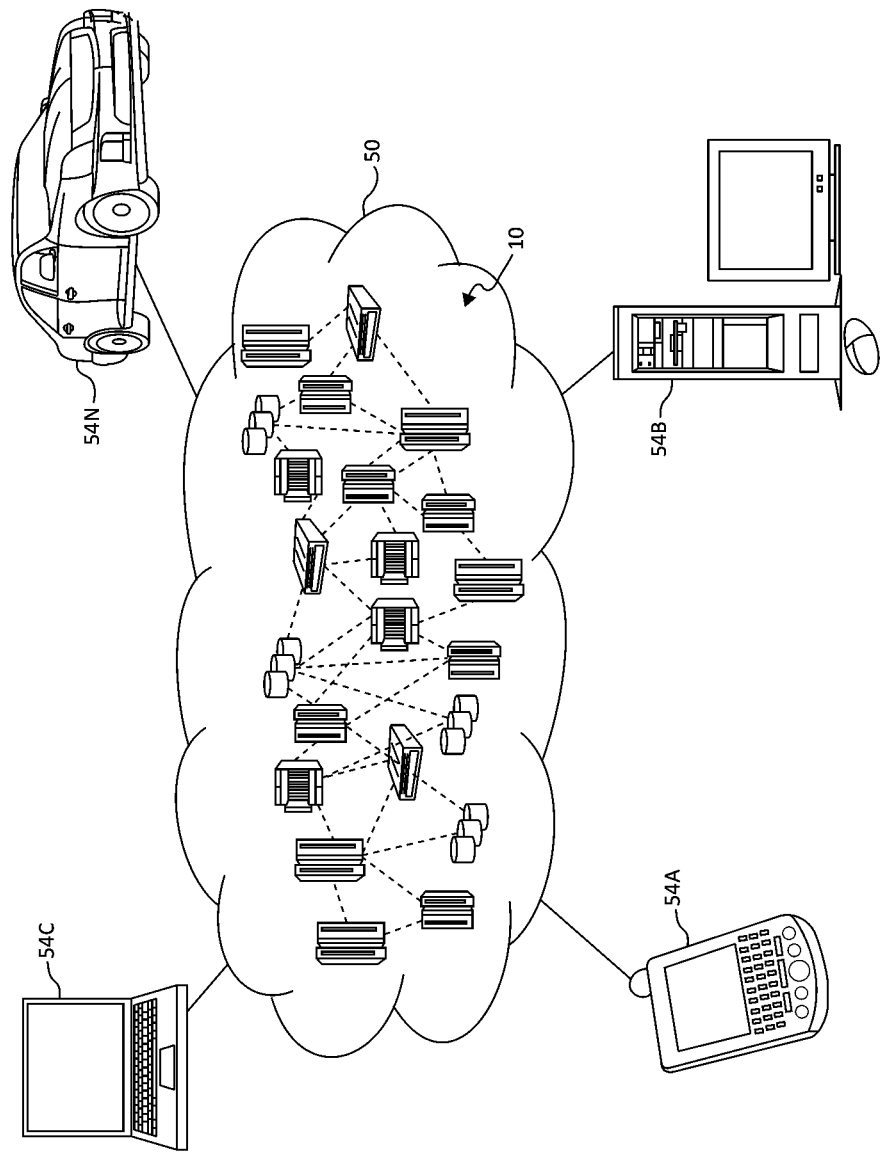
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
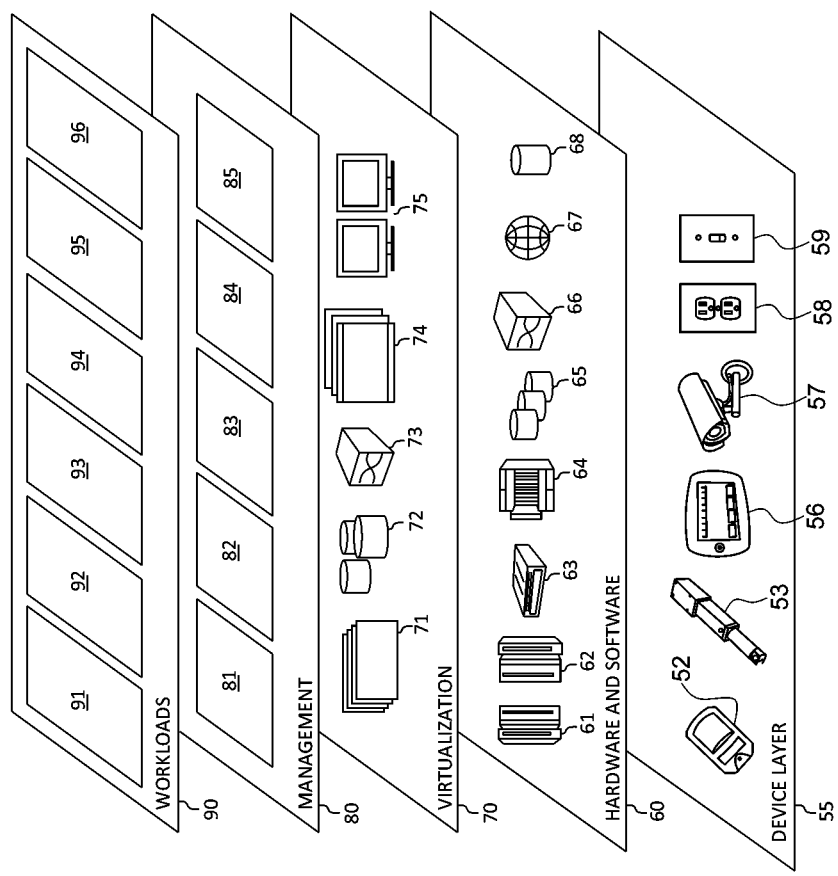
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for ensemble training in a distributed marketplace. In addition, workloads and functions 96 for ensemble training in a distributed marketplace may include such operations as data analytics, data analysis, and as will be further described, notification functionality. One of ordinary skill in the art will appreciate that the workloads and functions 96 for providing ensemble training in a distributed marketplace may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
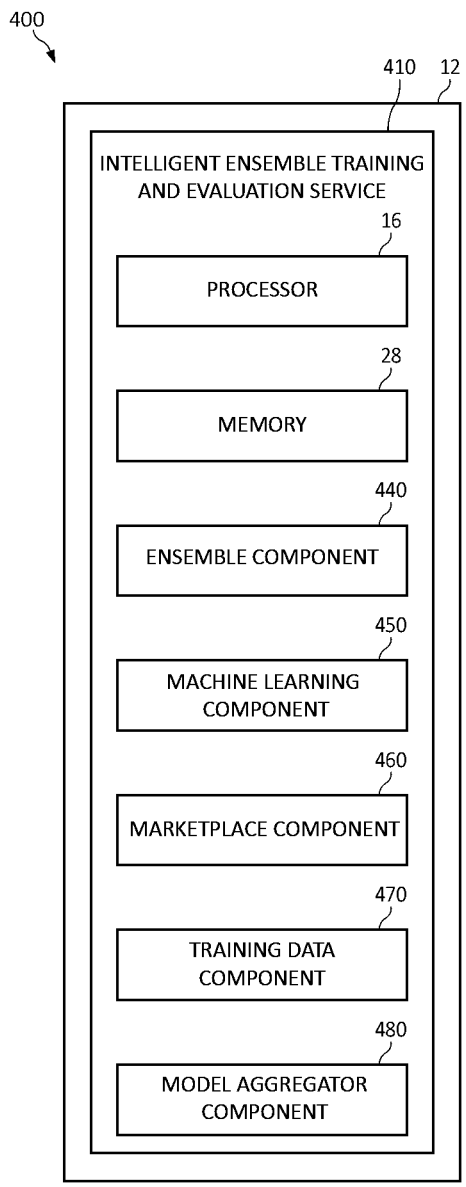
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates a system 400 for ensemble training in a distributed marketplace (e.g., a blockchain) in a computing environment. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for cognitive data curation in accordance with the present invention. Many of the functional blocks 400 may execute as background processes on various components, either in distributed computing components, or on the user device, or elsewhere.

Computer system/server 12 of FIG. 1 is shown incorporating an intelligent ensemble training and evaluation service 410. The intelligent ensemble training and evaluation service 410 may incorporate processing unit 16 ("processor") and memory 28 of FIG. 1 to perform various computational, data processing and other functionality in accordance with various aspects of the present invention. The intelligent ensemble training and evaluation service 410 may be provided by the computer system/server 12 of FIG. 1.

In one aspect, the computer system/server 12 and/or the intelligent ensemble training and evaluation service 410 may provide virtualized computing services (i.e., virtualized computing, virtualized storage, virtualized networking, etc.). More specifically, the intelligent ensemble training and evaluation service 410 may provide, and/or be included in, a virtualized computing, virtualized storage, virtualized networking and other virtualized services that are executing on a hardware substrate.

The intelligent ensemble training and evaluation service 410 may also function as a database, blockchain, and/or service that may store, maintain, and update data, services, and/or resources internal to and/or external to a cloud computing environment such as described in FIG. 2. In one aspect, the intelligent ensemble training and evaluation service 410 may assist in providing access to and/or assist in performing one or more various types of data, services and/or resources. In one aspect, the intelligent ensemble training and evaluation service 410 may provide an ensemble component 440, a machine learning component 450, a marketplace component 460 (e.g., a distributed marketplace such as, for example, a blockchain), a training data component 470, and a model aggregator component 480.

In one aspect, the intelligent ensemble training and evaluation service 410, in association with the ensemble component 440, the machine learning component 450, marketplace component 460, the training data component 470, and/or the model aggregator component 480, may provide one or more ensemble machine learning models from a plurality of machine learning models competing within the distributed marketplace that achieve a performance on ensemble training data equal to or greater than a selected performance threshold. The distributed marketplace may be a blockchain.

The ensemble component 440, in association with the training data component 470 and/or the model aggregator component 480, may receive the ensemble training data, the selected performance threshold and a transaction token from one or more machine learning nodes. Thus, the ensemble component 440, in association with the training data component 470 and/or the model aggregator component 480, may 1) coordinate and enable competition of model training over a common dataset, 2) coordinate and enable competition of ensemble optimizers over a common dataset, and/or 3) enable remuneration of model produces based on their relative performance over a common dataset.

The marketplace component 460 may activate a distributed marketplace (e.g., a blockchain) for training the plurality of machine learning models by those of a plurality of machine learning nodes in the distributed marketplace using the ensemble training data. The marketplace component 460 may define a marketplace for the training of one or more machine learning models over arbitrary datasets submitted to the marketplace.

The ensemble component 440, in association with the model aggregator component 480, may monitor performance of each of one or more of the plurality of machine learning models executed by those of the plurality of machine learning nodes. The ensemble component 440, in association with the model aggregator component 480, may monitor performance and a degree of performance accuracy of each of the one or more ensemble machine learning models executing the ensemble training data. That is, the ensemble component 440, in association with the model aggregator component 480, may keep track of performance of individual machine learning models proposed for a given dataset per model training node and/or track of the accuracy performance of ensembles combining machine learning models proposed to the market place.

The ensemble component 440, in association with the model aggregator component 480, may assign weights to the one or more ensemble machine learning models according to a degree of contribution.

The ensemble component 440, in association with the model aggregator component 480, may distribute transaction compensation to the plurality of training nodes according to a degree of contribution to the one or more ensemble machine learning models.

In an additional aspect, the ensemble component 440, in association with the training data component 470, the model aggregator component 480, and/or the machine learning component 450, may separate datasets into training and ensemble training sets. The ensemble component 440, in association with the training data component 470, the model aggregator component 480, and/or the machine learning component 450, may assist each model training nodes in training one or more machine learning models using the training and ensemble training sets.

The ensemble component 440 may optimize one or more machine learning models (e.g., combinations of models over an arbitrary dataset) using the training and ensemble training sets. The model aggregator component 480 may coordinate the machine learning model asks and bids.

It should be noted, that in one embodiment, by way of example only, the machine learning component 450 may perform a machine learning operation that may include, for example, an instance of IBM® Watson® such as Watson® Analytics (IBM® and Watson® are trademarks of International Business Machines Corporation). By way of example only, the machine learning component 450 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
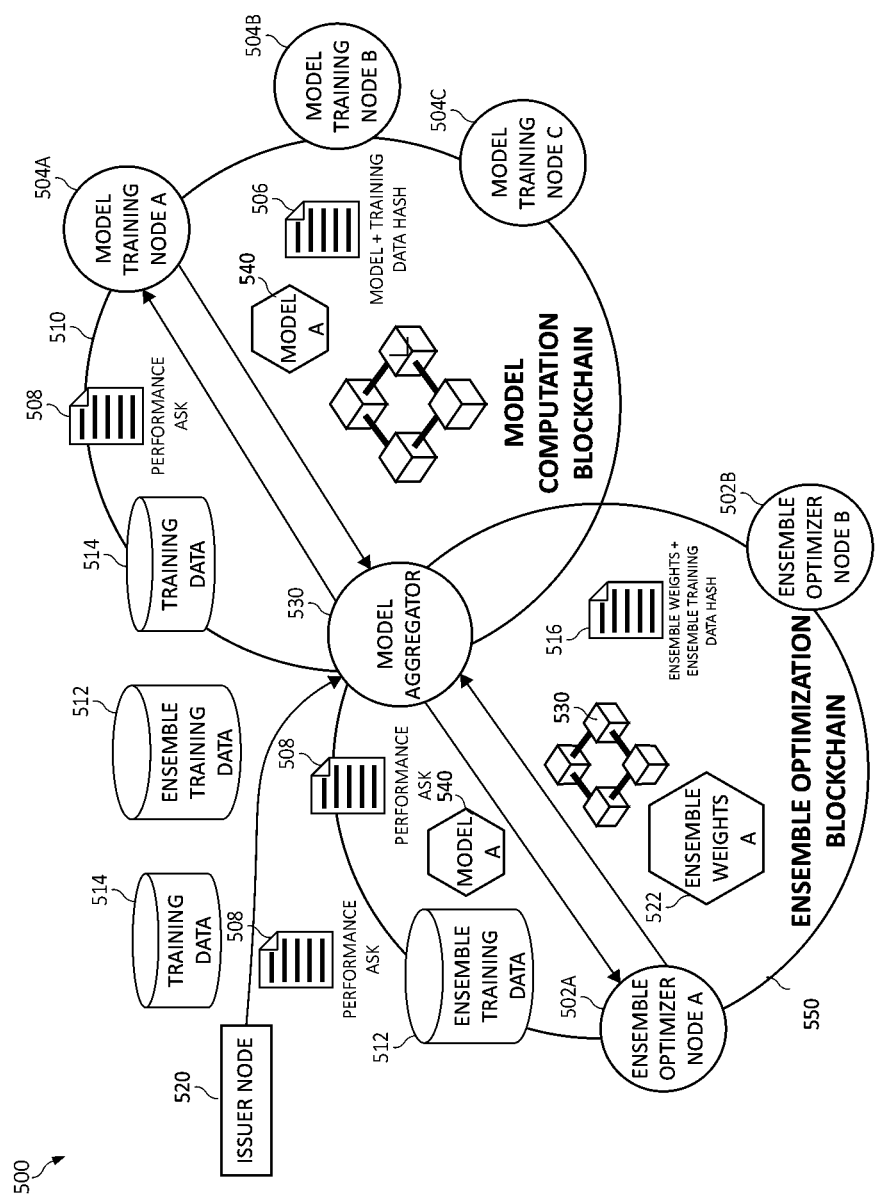
FIG. 5 is block diagram depicting an additional exemplary operations for ensemble training in a distributed marketplace in a computing environment which aspects of the present invention may be realized.

Turning now to FIG. 5, a block diagram depicting exemplary operations for ensemble training in a distributed marketplace in a computing environment which aspects of the present invention may be realized. In one aspect, one or more of the components, modules, services, applications, and/or functions described in FIGS. 1-4 may be used in FIG. 5. Repetitive description of like elements employed in other embodiments described herein (e.g., FIGS. 1-4) is omitted for sake of brevity.

As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for ensemble training in a distributed marketplace in accordance with the present invention. Many of the functional blocks 500 may execute as background processes on various components, either in distributed computing components, or on the user device, or elsewhere.

In step 1, an issuer node 520 may issue to a model aggregator node 530 a 1) performance ask 508, 2) training data 514, and 3) ensemble training data 512, 4) a maximum time limit (e.g., time limit threshold) the issuer node 520 is willing to wait for (e.g., only the model aggregator 530 will ever know this value), and 5) a payment token (e.g., a payment token equivalent to a price corresponding to a 100% accuracy plus the maximum of time units the model aggregator 530 can wait).

The dataset (e.g., the training data 514 and/or the ensemble training data 512) provided to the model aggregator node 530 may be of any type as long as the input and outputs are defined. That is, the dataset characteristics of what is considered an input and what is considered an output are defined to know how the dataset characteristics will performed for when building or training the machine learning model. For example, continuing with the publishing company example, as mentioned above, the input to the dataset may be a long list of sentences and the output may be the type of event labels (including a "No Event" Label), which the machine learning models need to match for a given input sentence.

It should be noted, by way of example only, to guarantee that as many compute nodes as possible may be used to attempt to train a model on using the provided dataset (e.g., the training data 514 and/or the ensemble training data 512), the issuer node 520 (e.g., a user node) should attempt to abide its dataset input/output structure to any existing standard relevant to the domain in which this dataset comes from (e.g., for NER for CoNLL format, BIOS formats, etc.). That is, a user submitting a dataset may try and conform the dataset input/output structures to dataset standards based on existing standard relevant to the domain (e.g., the field or environment). For example, in the field of NER, users may use the BIOS formats for labels with each word and/or sentence on a new line and the label separated from the word and/or sentence by a tab.

In step 2) the model aggregator 530 (e.g., model aggregator node) sends the performance ask 508, the training data 514, and the ensemble training data 512 to one or more model training nodes 504A-C such as, for example, model training node A 504B, model training node B 504B, and model training node C 504C. A hash of the training data and the performance ask may be stored on a model computation blockchain 510.

In step 3) the model training nodes 504A-C each execute and attempt to produce an optimized machine learning model (e.g., each of the model training nodes 504A-C attempt to generate the best or better machine learning model compared to the other model training nodes 504A-C), using a selected model architecture of chosen/selected by each individual model training nodes 504A-C (e.g., a neural network, support-vector machines "SVM," etc.) given the provided the training data 514, and the ensemble training data 512.

In step 4) the model training nodes 504A-C each returns the most optimized machine learning model such as, for example, model A 540 (e.g., the best model the individual model training node may generate based on one or more selected model architectures that is used) that each of the model training nodes 504A-C could produce/provide to the model aggregator 530. A hash 506 of the training data and each of the optimized machine learning models (e.g., model and training data hash 506) that are returned are stored on the model computation blockchain 510.

In step 5) the model aggregator 540 forwards 1) each of the model received by the model training nodes 504A-C, 2) the performance ask 508 and 3) ensemble training dataset 512 to one or more ensemble optimizer nodes 502A and/or 502B.

In step 6) given a set of models forwarded by the model aggregator 530, each ensemble optimizer nodes 502A and 502B, attempts to discover an optimal set of weights to combine all the models received, which provides optimal performance (e.g., provides one or more ensemble models from the provided models to increase performance accuracy better that other individual modes and/or other ensemble models) on the ensemble training data.

In step 7) whenever a performance higher than a minimum model performance is achieved/reached (e.g., as specified within the performance ask), a set of weights 522 (e.g., ensemble weights A) may be returned to the model aggregator 530 along with the performance level/accuracy obtained.

In step 8) the model aggregator 530 verifies that the performance level achieved on the ensemble training data 512 is correct and stores 1) a hash 516 of the weights and ensemble training data (e.g., ensemble weights and ensemble training data hash) on an ensemble optimization blockchain 550.

In step 8) the model aggregator 530 informs the issuer node 520 that a specific performance accuracy was reached/achieved (e.g., the performance accuracy in relation to the performance ask).

At this point, following step 9, consider a first scenario where the issuer node 520 determines the performance accuracy achieved is sufficient and requests to halt the transaction.

Thus, in step 10, the model aggregator 530 may distribute the transaction compensation (e.g., the value of the payment token) as follows: a) a fixed transaction compensation amount is delivered/provide to the ensemble optimizer node which achieved the most optimal model having the highest performance accuracy compared to the other ensemble optimizer nodes (e.g., best accuracy corresponding to the percentage of accuracy achieved higher than the minimum accuracy level requested within the performance ask), b) a fixed transaction compensation amount is delivered/provided to each model training node, in proportion to final weights attributed to each model that each model training node contributed, and/or c) the issuer node 520 is returned the combined ensemble model and the remaining unused value of the transaction compensation (e.g., the token) initially submitted.

Alternatively, as opposed to the first scenario, consider a second scenario (e.g., scenario 2) where the issuer node 520 decides to wait for any higher performance. Thus, following step 9, in step 10, the model aggregator 530 may continue to forward ensemble notifications for achieving an increased level of performance accuracy (e.g., achieving a level of performance accuracy greater than that already provided. In one aspect, "forward ensemble notification" may refer to or mean that the model aggregator 530 may forward notifications to the user whenever the ensemble has produced a model with a performance higher than the previous performance reported. For example, assume that the model aggregator 530 indicates to a user "Great News! A model with 85% accuracy is achieved" but the user indicates that the user will wait for a higher accuracy. Then five hours later the model aggregator 530 sends another notification to the user "Great News! A model with wit 89% accuracy is now achieved and available," which process may continuously repeat until a model having a desired accuracy level is achieved and the user accepts the model.

In step 11, if the maximum time allowed is achieved/reached, one or more of the steps described in the first scenario (e.g., scenario 1) may be performed.

Thus, in this way, the present invention enables data issuers to receive an ensemble of AI models optimized for an arbitrary dataset of their choice, (given a range AI techniques and architectures available) in exchange of a payment token. The present invention also enables model producers to be regularly remunerated for the production of AI models with respect to other competing modelling strategies and also enables data issuers to leverage the wide diversity of AI methods and architectures available for a given dataset.

Figure 6:
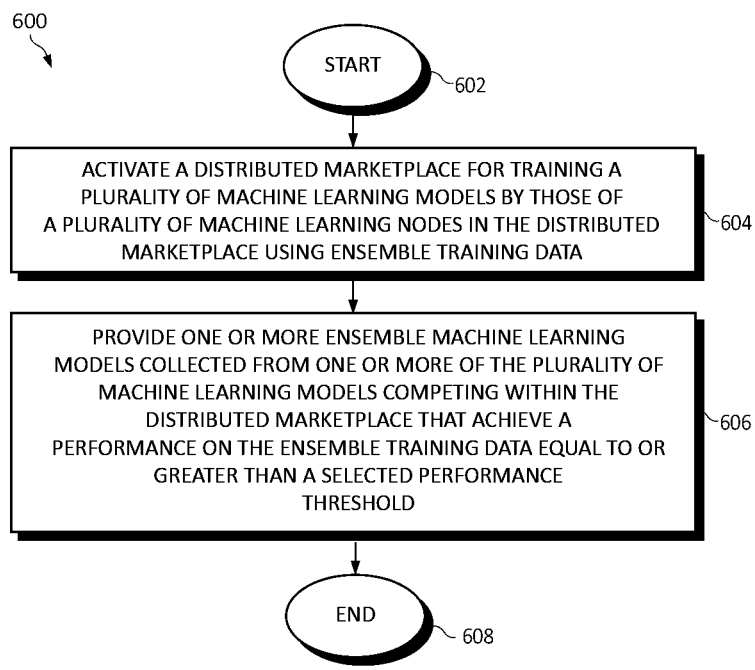
FIG. 6 is a flowchart diagram depicting an exemplary method for ensemble training in a distributed marketplace in a computing environment in which various aspects of the present invention may be realized.

FIG. 6 is an additional flowchart diagram 600 depicting an additional exemplary method for ensemble training in a distributed marketplace in a computing environment in which various aspects of the present invention may be realized. The functionality 600 may be implemented as a method executed as instructions on a machine, where the instructions are included on at least one computer readable medium or one non-transitory machine-readable storage medium. The functionality 600 may start in block 602.

A distributed marketplace may be activated for training a plurality of machine learning models by those of a plurality of machine learning nodes in the distributed marketplace using ensemble training data, as in block 604. One or more ensemble machine learning models may be provided that are collected from the plurality of machine learning models competing within the distributed marketplace that achieve a performance on ensemble training data equal to or greater than a selected performance threshold, as in block 606. The functionality 600 may end, as in block 608.

Figure 7:
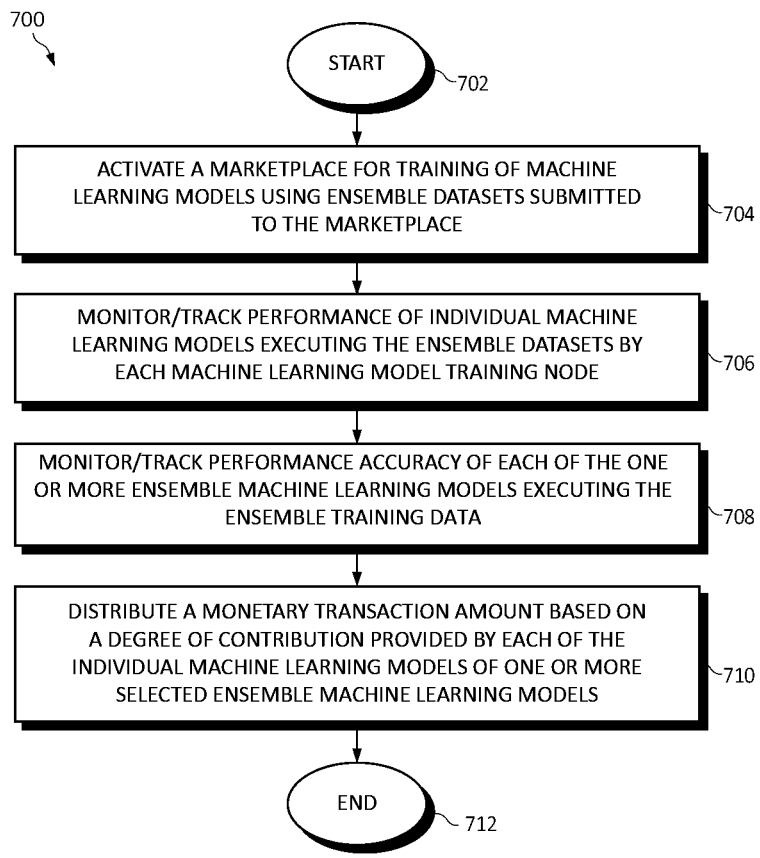
FIG. 7 is an additional flowchart diagram depicting an exemplary method for ensemble training in a distributed marketplace in a computing environment, again in which various aspects of the present invention may be realized.

FIG. 7 is an additional flowchart diagram 700 depicting an additional exemplary method for ensemble training in a distributed marketplace in a computing environment in which various aspects of the present invention may be realized. The functionality 700 may be implemented as a method executed as instructions on a machine, where the instructions are included on at least one computer readable medium or one non-transitory machine-readable storage medium. The functionality 700 may start in block 702.

A marketplace (e.g., a blockchain) may be activated for training of machine learning models using ensemble datasets submitted to the marketplace, as in block 704. The performance of individual machine learning models, executing the ensemble datasets by each machine learning model training mode may be monitored/tracked, as in block 706. The performance accuracy of each of the one or more ensemble machine learning models executing the ensemble training data may be monitored/tracked, as in block 708. A monetary transaction amount may be distributed (to one or more machine learning model nodes) based on a degree of contribution provided by each of the individual machine learning models of one or more selected ensemble machine learning models, as in block 710. The functionality 700 may end, as in block 712.

In one aspect, in conjunction with and/or as part of at least one block of FIGS. 6-7, the operations of methods 600 and/or 700 may include each of the following. The operations of methods 600 and/or 700 may receive ensemble training data, a selected performance threshold, and a transaction token from one or more machine learning nodes. The operations of methods 600 and/or 700 may activate the distributed marketplace for training the plurality of machine learning models by those of a plurality of machine learning nodes in the distributed marketplace using the ensemble training data. The operations of methods 600 and/or 700 may monitor performance of each of one or more of the plurality of machine learning models executed by those of the plurality of machine learning nodes. The operations of methods 700 and/or 700 may assign weights to the one or more ensemble machine learning models according to a degree of contribution. The operations of methods 600 and/or 700 may distribute transaction compensation to the plurality of training nodes according to a degree of contribution to the one or more ensemble machine learning models.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for ensemble training of machine learning models using one or more processors, comprising:
receiving, by a blockchain, a machine learning model request and a dataset split into training data and ensemble training data, wherein the machine learning model request specifies a selected performance threshold to perform a function on the dataset;
generating and recording a hash of the training data, the ensemble training data, and the selected performance threshold on the blockchain;
training, by each of a plurality of machine learning nodes, a respective machine learning model to aggregately generate a plurality of machine learning models by the plurality of machine learning nodes, each respective machine learning model trained under a selected one of differing model architectures, wherein each of the plurality of machine learning models trained by the plurality of machine learning nodes competes with one another to perform the function most optimally with respect to performance, and wherein the blockchain is used to incentivize each of the plurality of machine learning nodes to perform the training of the respective machine learning model utilizing common data to identify one or more of the plurality of machine learning models which most optimally perform the function with respect to the performance;
generating and recording a hash of model data of each of the plurality of machine learning models on the blockchain;
analyzing each of the plurality of machine learning models to identify weights applied to each respective machine learning model, and combining the plurality of machine learning models into one or more ensemble machine learning models according to the weights;
generating and recording a hash of data associated with the weights and the one or more ensemble machine learning models on the blockchain; and
providing the one or more ensemble machine learning models that perform the function on the dataset at the performance of equal or greater to the selected performance threshold.

2. The method of claim 1, further including receiving the ensemble training data, the selected performance threshold and a transaction token from one or more of the plurality of machine learning nodes.

3. The method of claim 1, further including activating the blockchain for training the plurality of machine learning models by one or more of the plurality of machine learning nodes in the blockchain using the ensemble training data.

4. The method of claim 1, further including monitoring performance of each of one or more of the plurality of machine learning models executed by one or more of the plurality of machine learning nodes.

5. The method of claim 1, further including monitoring performance and a degree of performance accuracy of each of the one or more ensemble machine learning models executing the ensemble training data.

6. The method of claim 1, further including assigning the weights to each of the plurality of machine learning models which form the one or more ensemble machine learning models according to a degree of contribution.

7. The method of claim 1, further including distributing transaction compensation to one or more of the plurality of machine learning nodes according to a degree of contribution to the one or more ensemble machine learning models.

8. A system for ensemble training of machine learning models in a computing environment, comprising:
- one or more computers with executable instructions that when executed cause the system to:
  - receive, by a blockchain, a machine learning model request and a dataset split into training data and ensemble training data, wherein the machine learning model request specifies a selected performance threshold to perform a function on the dataset;
  - generate and record a hash of the training data, the ensemble training data, and the selected performance threshold on the blockchain;
  - train, by each of a plurality of machine learning nodes, a respective machine learning model to aggregately generate a plurality of machine learning models by the plurality of machine learning nodes, each respective machine learning model trained under a selected one of differing model architectures, wherein each of the plurality of machine learning models trained by the plurality of machine learning nodes competes with one another to perform the function most optimally with respect to performance, and wherein the blockchain is used to incentivize each of the plurality of machine learning nodes to perform the training of the respective machine learning model utilizing common data to identify one or more of the plurality of machine learning models which most optimally perform the function with respect to the performance;
  - generate and record a hash of model data of each of the plurality of machine learning models on the blockchain;
  - analyze each of the plurality of machine learning models to identify weights applied to each respective machine learning model, and combine the plurality of machine learning models into one or more ensemble machine learning models according to the weights;
  - generate and record a hash of data associated with the weights and the one or more ensemble machine learning models on the blockchain; and
  - provide the one or more ensemble machine learning models that perform the function on the dataset at the performance of equal or greater to the selected performance threshold.

9. The system of claim 8, wherein the executable instructions when executed cause the system to receive the ensemble training data, the selected performance threshold and a transaction token from one or more of the plurality of machine learning nodes.

10. The system of claim 8, wherein the executable instructions when executed cause the system to activate the blockchain for training the plurality of machine learning models by one or more of the plurality of machine learning nodes in the blockchain using the ensemble training data.

11. The system of claim 8, wherein the executable instructions when executed cause the system to monitor performance of each of one or more of the plurality of machine learning models executed by one or more of the plurality of machine learning nodes.

12. The system of claim 8, wherein the executable instructions when executed cause the system to monitor performance and a degree of performance accuracy of each of the one or more ensemble machine learning models executing the ensemble training data.

13. The system of claim 8, wherein the executable instructions when executed cause the system to assign the weights to each of the plurality of machine learning models which form the one or more ensemble machine learning models according to a degree of contribution.

14. The system of claim 8, wherein the executable instructions when executed cause the system to distribute transaction compensation to one or more of the plurality of machine learning nodes according to a degree of contribution to the one or more ensemble machine learning models.

15. A computer program product for ensemble training of machine learning models using one or more processors, the computer program product comprising a non-transitory computer-readable storage medium having computer-readable program code portions stored therein, the computer-readable program code portions comprising:
- an executable portion that receives, by a blockchain, a machine learning model request and a dataset split into training data and ensemble training data, wherein the machine learning model request specifies a selected performance threshold to perform a function on the dataset;
- an executable portion that generates and records a hash of the training data, the ensemble training data, and the selected performance threshold on the blockchain;
- an executable portion that trains, by each of a plurality of machine learning nodes, a respective machine learning model to aggregately generate a plurality of machine learning models by the plurality of machine learning nodes, each respective machine learning model trained under a selected one of differing model architectures, wherein each of the plurality of machine learning models trained by the plurality of machine learning nodes competes with one another to perform the function most optimally with respect to performance, and wherein the blockchain is used to incentivize each of the plurality of machine learning nodes to perform the training of the respective machine learning model utilizing common data to identify one or more of the plurality of machine learning models which most optimally perform the function with respect to the performance;
- an executable portion that generates and records a hash of model data of each of the plurality of machine learning models on the blockchain;
- an executable portion that analyzes each of the plurality of machine learning models to identify weights applied to each respective machine learning model, and combines the plurality of machine learning models into one or more ensemble machine learning models according to the weights;
- an executable portion that generates and records a hash of data associated with the weights and the one or more ensemble machine learning models on the blockchain; and
- an executable portion that provides the one or more ensemble machine learning models that perform the function on the dataset at the performance of equal or greater to the selected performance threshold.

16. The computer program product of claim 15, wherein the executable portion that executable portion that receives the ensemble training data, the selected performance threshold and a transaction token from one or more of the plurality of machine learning nodes.

17. The computer program product of claim 15, wherein the executable portion that executable portion that activates the blockchain for training the plurality of machine learning models by one or more of the plurality of machine learning nodes in the blockchain using the ensemble training data.

18. The computer program product of claim 15, wherein the executable portion that executable portion that:
monitors performance of each of one or more of the plurality of machine learning models executed by one or more of the plurality of machine learning nodes; and
monitors performance and a degree of performance accuracy of each of the one or more ensemble machine learning models executing the ensemble training data.

19. The computer program product of claim 15, wherein the executable portion that executable portion that assigns the weights to each of the plurality of machine learning models which form the one or more ensemble machine learning models according to a degree of contribution.

20. The computer program product of claim 15, wherein the executable portion that executable portion that distributes transaction compensation to the plurality of machine learning nodes according to a degree of contribution to the one or more ensemble machine learning models.

\* \* \* \* \*